United States Patent
Gladstone et al.

(10) Patent No.: US 7,290,266 B2
(45) Date of Patent: Oct. 30, 2007

(54) ACCESS CONTROL BY A REAL-TIME STATEFUL REFERENCE MONITOR WITH A STATE COLLECTION TRAINING MODE AND A LOCKDOWN MODE FOR DETECTING PREDETERMINED PATTERNS OF EVENTS INDICATIVE OF REQUESTS FOR OPERATING SYSTEM RESOURCES RESULTING IN A DECISION TO ALLOW OR BLOCK ACTIVITY IDENTIFIED IN A SEQUENCE OF EVENTS BASED ON A RULE SET DEFINING A PROCESSING POLICY

(75) Inventors: Philip J. S. Gladstone, Framingham, MA (US); Jeffrey A. Kraemer, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 535 days.

(21) Appl. No.: 10/071,328

(22) Filed: Feb. 8, 2002

(65) Prior Publication Data
US 2003/0023774 A1    Jan. 30, 2003

Related U.S. Application Data

(60) Provisional application No. 60/298,590, filed on Jun. 14, 2001.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 17/00* | (2006.01) |
| *G06F 7/04* | (2006.01) |
| *G06N 5/02* | (2006.01) |
| *G06N 7/04* | (2006.01) |
| *H04L 9/00* | (2006.01) |

(52) U.S. Cl. .......................... 719/318; 706/47; 706/54; 713/152; 713/165; 726/26

(58) Field of Classification Search ................ 706/47, 706/54; 713/165–167, 152; 726/1, 26–27, 726/4, 21; 718/102, 104; 710/260, 262; 700/47; 715/741, 743; 719/318
See application file for complete search history.

(56) References Cited

U.S. PATENT DOCUMENTS

| | | | |
|---|---|---|---|
| 5,925,126 A | 7/1999 | Hsieh | 713/200 |
| 6,633,923 B1 * | 10/2003 | Kukura et al. | 719/316 |
| 2002/0099738 A1 * | 7/2002 | Grant | 707/513 |
| 2002/0194495 A1 | 12/2002 | Gladstone et al. | |

FOREIGN PATENT DOCUMENTS

| | | |
|---|---|---|
| WO | WO 00/56027 | 9/2000 |
| WO | WO 01/31420 A2 | 5/2001 |

OTHER PUBLICATIONS

Meng et al, "Achieving Dynamic Inter-Organization Workflow Management by Integrating Business Processes, Events and Rules", IEEE Proceedings of the 35th Annual Hawaii International Conference on System Sciences, Jan. 7-10, 2002.*

Ping Liu, The Design and Implementation Of A Reference Monitor for the 2K Operating System, B.E., Tsinghau University, 1995, XP-0022.

(Continued)

*Primary Examiner*—David Vincent
*Assistant Examiner*—Benjamin Buss
(74) *Attorney, Agent, or Firm*—Chapin IP Law, LLC; Barry W. Chapin, Esq.

(57) ABSTRACT

A Stateful Reference Monitor can be loaded into an existing commercial operating system, and then can regulate access to many different types of resources. The reference monitor maintains an updateable storage area whose contents can be used to affect access decisions, and access decisions can be based on arbitrary properties of the request.

18 Claims, 3 Drawing Sheets

OTHER PUBLICATIONS

Anderson, Debra et al., "Next-generation Intrusion Detection Expert System (NIDES) A Summary," Technical Report SRI-CSL-95-07, Computer Science Laboratory, SRI International, May 1995, 47 pgs.

Neumann, Peter G. et al., "Experience with EMERALD to Date", 1st USENIX Workshop on Intrusion Detection and Network Monitoring, Santa Clara, California, Apr. 11-12, 1999, pp. 73-80.

Snapp, Steven R. et al., "DIDS (Distributed Intrusion Detection System)—Motivation, Architecture, and An Early Prototype", Proceedings of 14th National Computer Security Conference, Washington, D.C., Oct. 1991, pp. 167-176.

Spafford, Eugene H. et al., "Intrustion detection using autonomous agents", Computer Networks 34 (2000), pp. 547-570.

Wallach, Dan S. et al., "Understanding Java Stack Inspection", IEEE Proceedings of Security & Privacy, May 1998, pp. 1-12.

* cited by examiner

ACCESS CONTROL BY A REAL-TIME STATEFUL REFERENCE MONITOR WITH A STATE COLLECTION TRAINING MODE AND A LOCKDOWN MODE FOR DETECTING PREDETERMINED PATTERNS OF EVENTS INDICATIVE OF REQUESTS FOR OPERATING SYSTEM RESOURCES RESULTING IN A DECISION TO ALLOW OR BLOCK ACTIVITY IDENTIFIED IN A SEQUENCE OF EVENTS BASED ON A RULE SET DEFINING A PROCESSING POLICY

CROSS-REFERENCE TO RELATED APPLICATION

The present application claims domestic priority under 35 U.S.C. §119(e) to copending U.S. provisional patent application Ser. No. 60/298,590 filed Jun. 14, 2001.

BACKGROUND OF THE INVENTION

The present invention related generally to software that controls an operating policy of a computer system. For example, access to various system resources, such as files and network connections may be so controlled.

Modern computer systems are controlled by two levels of software: an operating system and application software. The operating system maintains a separation in the memory of the computer between the operating system, said to execute in operating system space, and the applications, said to execute in applications space.

Applications are the software that provides solutions to business problem, such as processing e-mail messages. Applications perform their work by communicating requests for access to resources such as network connections or files stored on a storage medium to the operating system, which then fills these requests.

It may be desired to control any one or more of a wide variety of operating policies. One common scenario is to control access to various system resources, as mentioned above, for purposes of securing a system against deliberate and malicious attack or for purposes of ensuring correct and non-interfering operation of various processes. For purposes of illustration, access control for security purposes is discussed. However, the skilled artist will understand that the discussion has wider implications, as explicitly pointed out and as implied in the following discussion.

Referring to the example of security systems, access is conventionally controlled by one or more real-time processes, while policy is independently established with the assistance of one or more non-real-time processes. In the context of this description, a real-time process is one whose action is sufficiently immediate as to imperceptibly affect the speed at which transactions with which the real-time process is connected are processed. A non-real-time process is one that processes transactions at a speed substantially slower than the instantaneous rate at which transactions naturally occur.

Real-time access control processes and data structures include, but are not limited to reference monitors, access control lists, permissions flags, access tokens and process ID checking.

A reference monitor is a component of a computer system that determines whether an access by one component, for example a user process, of another component, for example, a file is permitted.

As used hereinafter, dynamic state is a collection of information, that is collected in real-time, indicative of a condition of a machine or process as a result of a particular sequence of events leading to the condition. A stateless system or component is one, which does not collect such data.

Conventional reference monitors, herein referred to as stateless reference monitors, are found in the kernels of various Operating Systems, including, for example, MicroSoft® Windows™ 2000 OR UNIX. They are used to determine whether a particular access to a file or other resource is permitted.

Conventional operating systems contain embedded stateless reference monitors to control access to resources. User processes are started and identified to users on the basis of the user supplying certain identity tokens. In most cases the access decision is made based on the identity of the user whose local program or process makes the request and one or more static permissions flags or an access control list associated with the resource. For examples, see Unix or Windows 2000. The contents of static permissions flags and access control lists do not include information representing the current state of the system, but rather include information that produces identical results regardless of the state of the system.

Most conventional reference monitors deals with a single resource type (such as files or network connections). Some, such as eTrust Access Control v.5.1 from Computer Associates, protect multiple resource types.

Some operating systems give finer control by associating individual permissions with each user, and then checking those permissions against the static access control list of the resource. This is an improvement, but typically there are only a limited number of permission flags. Security-Enhanced Linux is an example of such an operating system.

There are operating systems that are even finer grained, and allow individual users to offer a set of tokens, and if any match those found in the access control list, then access is granted.

There are operating environments that can include the origin of the requesting program in their access control decision. For example, see Dan Wallach and Edward Felton, "Understanding Java Stack Inspection", IEEE Proceedings of Security & Privacy, May 1998.

Non-real-time processes are conventionally employed to collect date and analyze past events in order to establish or modify effective policies, for example security policies. Typical, conventional non-real-time processes include intrusion detection systems, for example.

One type of intrusion detection system is an autonomous agent that polls, monitors and/or periodically mines log files for data indicative of an intrusion. A drawback of such non-real-time systems is that intrusions are only detected "after the fact." The intruder leaves an audit trail of actions recorded in log files and elsewhere for which the only reasonable explanation is an intrusion. However, by the time such a non-real-time intrusion detection system identifies an intrusion, the intruder is long gone and damage done.

For examples, see Peter G. Neumann and Phillip A. Porras, "Experience with EMERALD to Date", 1st USENIX Workshop on Intrusion Detection and Network Monitoring, April 1999; Eugene Spafford et al. "Intrusion detection using autonomous agents" Computer Networks 34 (2000); and Steven R. Snapp et al., "DIDS (Distributed Intrusion Detection System)—Motivation, Architecture, and An Early Prototype", Proceedings of the 14th National Computer Security Conference, October 1991.

The analysis performed by intrusion detection systems such as have been described or referred to above is useful for developing policies to be enforced by real-time components, such as also described above. For example, there are reference monitors who can follow more complex rules based on patterns mined by an intrusion detector from past behavior, but they cannot update their state on each controlled request. For example, see Debra Anderson et al., "Next-generation Intrusion Detection Expert System (NIDES) A Summary", SRI International, May 1995.

The rise of network computing, with the attendant dangers of remote hackers, renders the access control decision more difficult. Most systems base their access control decisions on the identity of the local requesting program which is tied to a particular user, as noted above, and not on the presumably unknown identity of the remote hacker.

Moreover, conventional systems constructed of obvious combinations of the foregoing do not detect or control access based on pattern of behavior that cross the lines between diverse users, processes, access types, etc. Conventional systems constructed of obvious combinations of the foregoing do not adjust policies dynamically, in real-time, in response to newly experienced threats.

Conventional systems suffer from a lack of dynamic state inherent to stateless reference monitors, and that they are not very resilient in the face of local application programming errors through which a remote attacker can subvert a trusted local program. Application programming errors, i.e., bugs, will always continue to exist as the programmers are fallible and the testing cannot reasonably anticipate all manner of malicious attacks.

When conventional reference monitors are used, once an attacker has managed to subvert a local application, the attacker typically has all the rights and privileges of that application. In the case of an e-commerce server, this may include the ability to look at transaction histories and the associated credit card information.

Finally, as already discussed above, conventional systems cannot detect and react to attacks in which diverse parts of the attack are performed by seemingly normal operations of diverse programs or processes, that only form the attack when taken in combination.

SUMMARY OF THE INVENTION

The present invention provides an improved system, method and software product for controlling an operating policy of a computer system, such as a security policy. According to one aspect of an embodiment of the invention, a real-time reference monitor software product comprises, on a machine-readable medium, a sequence of instructions defining a storage area where real-time state information is stored and from which the state information is restored; a plurality of rules defining allowable activity based on a pattern of activity; and plural interceptors identifying and governing the activity based on an application of the rules to the activity. The software product may include a process, which correlates the state information across different ones of the plural interceptors. At least one of the plural interceptors can be a pre-existing element of a conventional computer operating system. The process which correlates the state information can include a rule which defines permissible resource references in view of activity identified by the interceptors resource reference and the state information; and a rule interpreter which applies the rule to the activity identified and the state information. The rule can be modified without restarting the real-time reference monitor.

The plural reference interceptors can correspond to more than one resource type and wherein the storage area is a single storage area. The storage area contents can be preserved when the rules are modified. The software product can further include an application program interface that can send messages to application programs on the same system. The software product can also further include an application program interface that can send messages to application programs on other systems. The plural reference interceptors can monitor two or more of file access, registry access, network access, object access, system call access, keyboard access, external inputs and user input. According to another aspect of an embodiment of the invention, a computer-implemented reference monitor includes a monitoring process, executing on a computer, which detects plural defined events and generate event messages; a storage device, on the computer, in which is stored information related to the event messages generated by the monitoring process; and a rule interpreting process, executing on the computer, which responds to characteristics of an event message the information stored in the storage device and a set of rules by modifying operation of the computer. The set of rules can be modified in response to the information stored in the storage device. The set of rules can be modified and wherein information stored in the storage device is preserved when the set of rules is modified. Finally, an external event message generating process can execute on another computer and can communicate event messages to the rule interpreting process.

According to yet another aspect of an embodiment of the invention, a method of implementing a processing policy on a computer includes detecting first and second events, each having one of a plurality of defined event types; generating first and second event messages, each containing information about a corresponding one of the first and second events; storing the information about the first event; and enforcing the policy responsive to the stored information about the first event and the information about the second event. The method may further include applying one of a set of rules to the stored information about the first event and the information about the second event to determine the nature of enforcing the policy. The method may yet further include executing an operating system on the computer; changing the set of rules without restarting the operating system and without losing the stored information. Finally, the method may include changing the set of rules without interrupting the detecting, generating, storing and enforcing.

BRIEF DESCRIPTION OF THE DRAWINGS

In the drawings, in which like reference designations indicate like elements.

DETAILED DESCRIPTION

Figure 1:
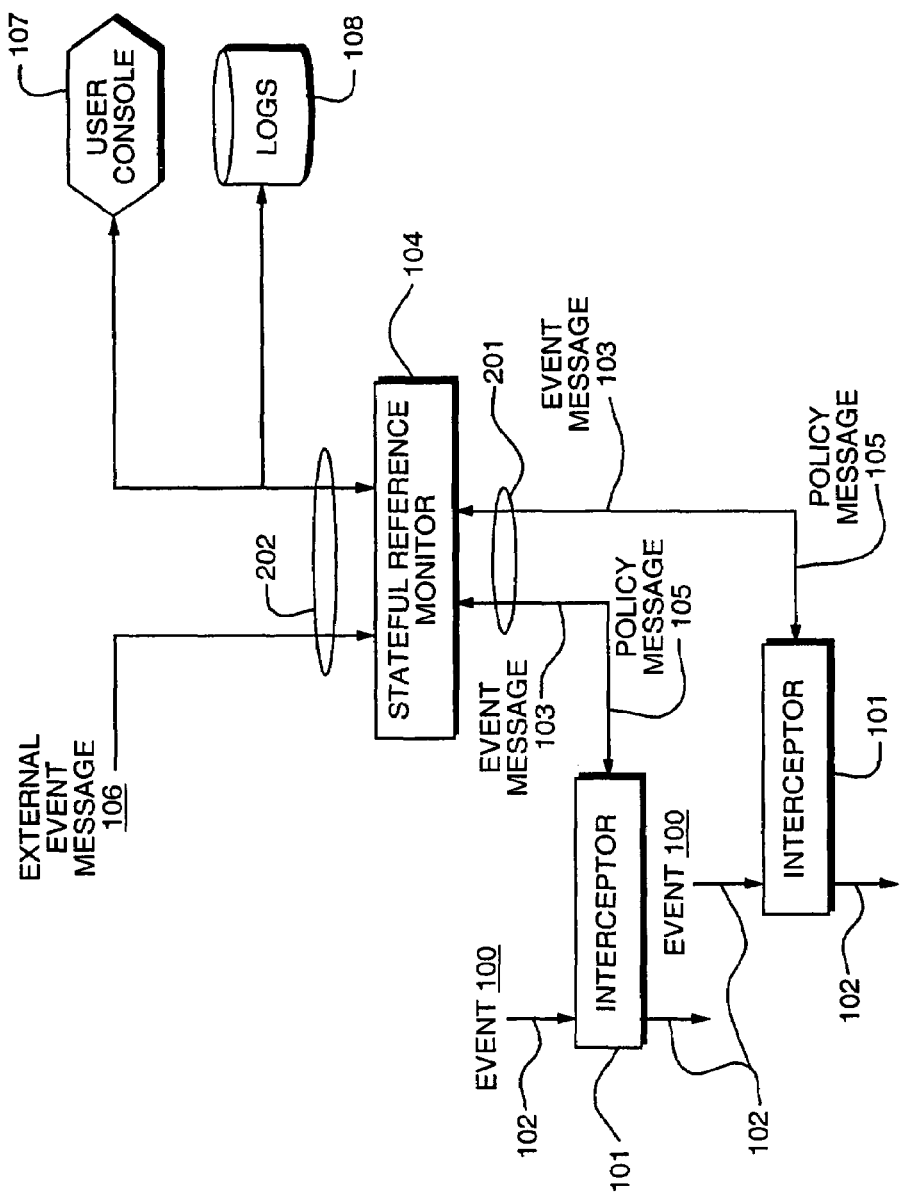
FIG. 1 is a functional block diagram of a software system embodying aspect of the invention.

The invention will be better understood upon reading the following detailed description of various aspects of embodiments thereof.

Aspects of an embodiment of the invention are now illustrated in connection with FIG. 1. The exemplary embodiment is in the computer system security field, but the invention can readily be embodied in systems in other fields of endeavor, as will be evident to the skilled artisan.

In computers, one important aspect of system security is monitoring system events 100, e.g. access requests to a resource, and controlling the effect of those events, e.g. blocking or allowing the requested access to a resource. In order to monitor events, interceptors 101 are inserted in the control or communication paths 102 traversed by those events. For example, if an event monitored is a network access request, the interceptor 101 is inserted in the operating system at a point where the network access request is communicated from one portion of the operating system to another. The interceptor 101 generates an event message 103 for each event 100 intercepted. Event messages 103 are communicated to a stateful reference monitor 104, which returns a policy message 105 to the interceptor 101. The policy message 105 may be an action for the interceptor 101 to take, such as allowing an access request event 100 to continue along the control or communication path 102 to have its intended effect, or not allowing the event 100 to pass along path 102. External event messages 106, generated by other, unspecified event monitors can also be processed by the stateful reference monitor 104. The stateful reference monitor 104 also communicates with a user console 107 and log files 108.

Figure 2:
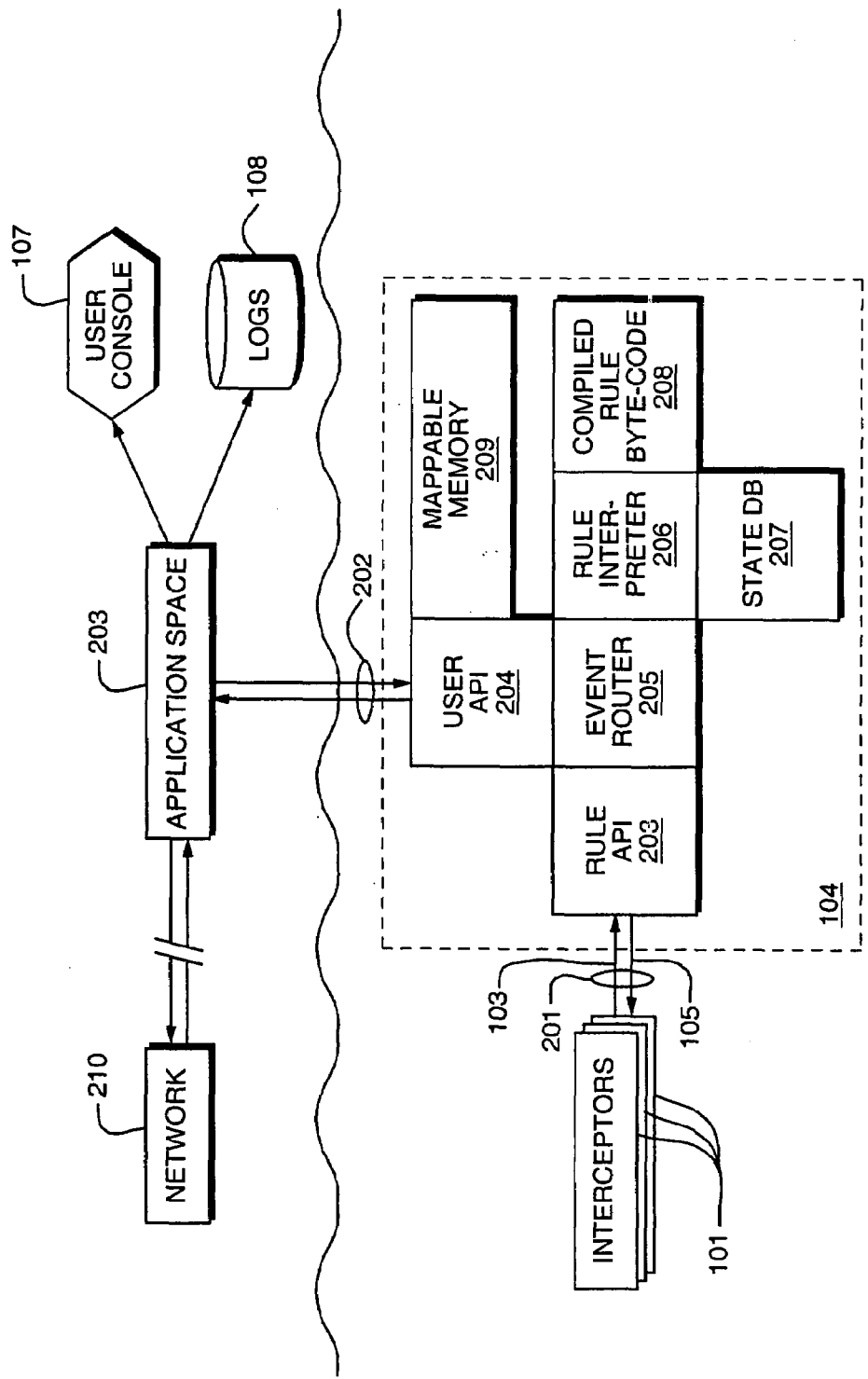
FIG. 2 is a detailed functional block diagram of the software system of FIG. 1.

The stateful reference monitor 104 of FIG. 1 is now explained in further detail, in connection with FIG. 2. An exemplary reference monitor 104 is designed to run as part of the operating system, as a driver. The exemplary reference monitor 104 is referred to herein as a stateful reference monitor because it retains and relies on changing system state information in implementing decision policies, as explained below. The stateful reference 104 monitor communicates with other parts of the operating system and with applications through communication channels. One channel 201 carries event messages 103 and policy messages 105, as discussed above. The other channel 202 carries external event messages 106, as well as other messages to and from application space 203, including but not limited to messages to and from the user console 107 and logs 108.

Communication channel 201 transfers messages into and out of the stateful reference monitor 104 through a rule application programming interface (API) 203. Communication channel 202 transfers messages into and out of the stateful reference monitor 104 through a user API 204.

Within the stateful reference monitor 104, messages of all kinds, but particularly event messages 103 and external event messages 106 are routed and directed by an event router 205, between the rule API 203, the user API 204 and other components of the stateful reference monitor 104. The event router 205 is the communication center of the stateful reference monitor 104, directing and controlling all internal communication.

The primary operational logic of the stateful reference monitor 104 is contained in the rule interpreter 206, which also makes use of the contents of a state database 207 and of compiled rule byte-code 208. The rule interpreter 206 can be a small, straightforward piece of logic that can be made extremely bug-proof by design. The state database 207 is simply a repository of dynamic state information, and thus also easily bug-proofed. The state database 207 may reside at least in part in a persistent memory or storage location so that it survives an operating system reboot.

The compiled rule byte-code 208 represents the operational policies to be enforced and against which activities and state in the system are checked. As such, much of the complexity of the system can reside in the byte-code 208. Although the byte-code 208 also should yield to design techniques that reduce or eliminate bugs, it is worth noting that bugs in the byte-code 208 cannot cause the operating system to crash, but can merely result in improper policy decisions. Thus, a more robust system results from the partitioning of the rules into the byte-code 208 and the interpretive logic into the rules interpreter 206.

State information can be, but is not limited to, information that a certain event occurred within a certain time of the present time. Suppose a prohibited combination of events is denoted X-Y-Z. That is, Event X, Event Y and Event Z must occur within a certain timeframe to produce a bad result. Then, if the state database 207 holds information X-Y, a rule in byte-code 208 will prohibit Z. But, another rule in byte-code 208 will cause event X and/or event Y to be purged from state database 207 after a suitable time. Events X, Y and Z need not be associated with the same user or process, or may be so associated, depending upon the type of behavior to be controlled. Finally, the stateful reference monitor 104 includes mappable memory 209, to aid with communication between the stateful reference monitor 104 and applications in application space 203 or accessible through a network 210. Mappable memory 209 is simply a portion of system memory addressable by both the stateful reference monitor 104 and other applications, such that data transfer may be easily accomplished by writing to and reading from a predetermined location, without requiring special communication apparatus, mechanisms or protocols.

Interceptors 101, like the stateful reference monitor 104, are also implemented in the exemplary embodiment as drivers loaded with, but independent of, the operating system kernel. Interceptors 101 interact with the operating system at a very low level, by intercepting various types of operating system requests, etc., referred to herein as events, for example requests for access to operating system resources such as a file or network connection. When an interceptor 101 intercepts an event, it generates an event message 103, as discussed above. Each intercepted event is treated by the stateful reference monitor 104 as a request for an interpretation of the event in light of the rules represented by the rules byte-code 208 and the contents of the state database 207. The result of the stateful reference monitor 104 applying the rules contained in the byte-code 208 to the event message 103 and the contents of the state database 207 is a policy message 105, which is sent to the interceptor 101. The interceptor 101 then implements the contents of the policy message 105, for example blocking or allowing a resource access.

Interceptors 101 can take other forms, as well. They may simply be APIs allowing the stateful reference monitor 104 to observe some aspect of operating system behavior and to modify that behavior accordingly. For example, with suitable modification, an interceptor 101 can detect an operating system performance characteristic and tune a related parameter, in response.

Interceptors 101 need be inserted only in paths affecting resources important to the purpose for which the stateful reference monitor 104 is intended. In a security application, such resources may include but are not limited to, one or more of: Windows Registry access requests, network access request, windows/system/32 directory access requests and Outlook personal address books access requests. Interceptors 101 can also extract inputs from other sources, such as a virus scanner log file.

As indicated above, access to user-level applications or to the stateful reference monitor 104 through user-level applications is given through the application space 203. A graphical user interface (GUI) running on a user console 107 may give the user access to the stateful reference monitor 104, for example to monitor performance, to view logs and to adjust operational parameters and policies. The GUI accessed through the user console 107 may be a conventional browser, for example, or may be a proprietary software program designed for the purpose. A database or file system holding operational logs, error logs and the like 108, is also accessible through application space 203. The use of logs and the specific types of logs used will be defined by the skilled artisan based upon specific individual requirements. Network connections 210 are also accessed by the stateful reference monitor 104 through application space 203. These network connections 210 are those over which external event messages 106 arrive.

Now, the detailed operation of the stateful reference monitor 104 is described. Operations may be divided into two classes, normal operations and boot-time operations.

During normal operations, an event is intercepted by an interceptor 101, and an event message 103 transmitted to the stateful reference monitor 104. Events which are normally passed on to other parts of the operating system, such as file access requests and network connection requests are temporarily held up by the interceptor 101, so that they do not have their ordinary, immediate effect, while the stateful reference monitor 104 makes a decision based on the processing policy then in effect as to whether to block or allow the event to be transmitted.

Event messages 103 from the interceptors 101 are received in the stateful reference monitor 104 by the rule API 203. The rule API 203 is a simple interface for receiving and transmitting messages to interceptors 101, which may be specially written for compatibility with the stateful reference monitor 104 or may be a packaged component of the operating system or may be provided by any party as an add-on component. The rule API 203 simply passes event messages 103 on to the event router 205. As will be seen below, the rule API 203 also passes messages out from the event router 205 to the interceptors 101, when required.

The event router 205 is the communication nerve center of the stateful reference monitor 104. Any type of message that must be moved from one component to another component of the stateful reference monitor 104 is transferred by the event router 205. Other than moving messages as directed, the event router 205 need not perform any other processing of messages, although the skilled artisan may incorporate other processing in the event router 205 as required by a particular application.

The event router 205 queues messages for the receiving components of the stateful reference monitor 104 according to priority. In the case of event messages 103, priority may be based on event type, for example. Thus, a network access event that may be time sensitive may be processed ahead of a file access event that has no such time sensitivity.

Events are identified in the event messages 103 to the application which produced the event, rather than the user, as is customary in conventional systems, which allows policies to be set and executed orthogonal to the user community. This is in contrast to those conventional systems, in which processing policies such as security and access control policies operate on the basis of the user generating an event, and the rights and privileges attributed to that user.

Queued events are picked up in priority order by the rule interpreter 206 for processing. First, the rule interpreter 206 determines whether the event described by the event message is of a type designated as part of the dynamic state information to be stored in the state database 207. If so, then information about the event is stored in the state database 207. The information stored, may include some or all of, but not necessarily limited to, time of the event, type of event, application generating the event, user owning the application and the like.

Next, the type of the event determines which segment of the compiled rules byte-code 208 will be addressed by the rule interpreter 206. Within the segment of the compiled rules byte-code 208, the rule interpreter 206 executes a switch function based on the opcode.

Within a segment, a sequence of rules is executed by following this pseudo-code sequence:

```
While (!done)
    { get next instruction
        switch (Opcode)
            { case 1: Action 1
              case 2: Action 2
              case 3: Action 3
            }
    }
```

A significant performance improvement may be obtained by optimizing the argument of the foregoing "switch (Opcode)" statement. Switch statements are most efficient when the expected cases are consecutive integers beginning with 1. Therefore, in order to manage the values of opcodes that must be handled by the switch function in the rule interpreter 206, the opcodes are translated by the following pseudo-code before the byte-code is first used:

```
While (more byte-code instructions)
    { get next instruction
    switch (opcode)
        { case realOpcode 1: replace opcode by integer = 1;
          case realOpcode 2: replace opcode by integer = 2;
          . . . }
    }
```

Boot-time operation is similar to normal operation, except that different rules may be followed, especially in security applications, in order to specialize policies for what could be a particularly vulnerable process. Moreover, specialized boot-time rules can be extremely simple and tightly written because the boot-time operating system environment is highly controlled.

In order to provide different sets of rules at different times, the compiled rule byte-code 208 is stored in a data structure that permits selection between an active rule set and inactive rule sets by use of a software switch, as is known in the art. Thus, the system is assured to be running only one set of rules at a time, not a mixture of rules. Moreover, when rules are loaded, various processes, such as rule checks can be performed. This arrangement is particularly advantageous for having different sets of rules operative during boot-time than other times. The rules need not all be stored and loaded at boot up, thus saving space and time. Boot-time rules can be stored in and loaded from the Windows-based system. Later, the rules for use when boot-up is done can be loaded from a network resource or from a file. In general, rules byte-code 208 is a downloadable program and rules interpreter 206 is a virtual machine. Thus, the rules can be changed at any time without shutting down or restarting the operating system. In an alternate arrangement, the compiled rule byte-code 208 can be stored in a fixed location that can be overwritten easily without shutting down the stateful reference monitor 104 or rebooting the operating system.

As indicated above, various types of patterns of events can be programmed into the rules byte-code 208, for detection and action. A simple combination, X-Y-Z, was given as an example, earlier. However, the rules can also identify as a prohibited pattern, any pattern not seen before. This type of rule is useful in an environment where the system can first be "profiled," i.e., operated in a state collection mode, wherein normal combinations and patterns of activity are stored in state database 207. Such a system is subsequently placed into a "lockdown" mode, wherein both pre-programmed patterns and unusual patterns are detected and acted upon. This type of profiling is preferably done in the environment in which the system will be operated, so as to capture the true range of behavior. Rules can also be tightened or relaxed dynamically through user manipulation of the bye-code 208 through a suitable program interface at the user console 107.

In addition to policy messages 105 and communication with the user console 107, the stateful reference monitor can generate a variety of levels of warning and alarm, at least some of which permit the user to select whether to allow a questionable action or not. This feature is generally useful, but has particular use in a system, which was profiled as, described above. Once in lockdown, there may still be unseen, but nominally safe, behaviors that the user can pass judgment on. The stateful reference monitor 104 alerts the user as to the condition and can record the behavior as permissible or not depending on the rules defined in byte-code 208.

An embodiment of the invention is now described in connection with securing computer systems against malicious users and software.

Security of computer systems is enhanced by using a stateful reference monitor that can make use of saved state—including previous access control decisions—in making new decisions. The illustrative stateful reference monitor integrates and correlates the access requests for a number of different resource types—files, system configuration information, network access, system calls, local or remote object invocation, etc. This comprehensive view into the operating environment enables the stateful reference monitor 104 to make better access control decisions than a conventional, single resource type stateless reference monitor.

The stateful reference monitor detects anomalous behavior and prevent further accesses. For example, if an e-commerce server has once been subverted, it will subsequently behave differently, and this can be detected as a departure from normal.

The stateful reference monitor 104 uses a state database 107 to hold information for periods of time, and uses this information to improve the quality of its decisions.

As described above, the stateful reference monitor 104 intercepts the access requests using interceptors 101 inserted into the request path. These interceptors 101 are implemented using a variety of mechanisms, depending on the resource type and operating system. For example, under Windows NT:

File requests are intercepted using a Microsoft provided file system filter API. The interceptor 101 is in the path of all requests. It extracts the filename from the available information and normalizes the request before submitting it to the stateful reference monitor 104. The stateful reference monitor 104 response determines whether the request is allowed to proceed, or whether an error code is returned to the operating system.

Registry requests are intercepted by replacing the registry system call functions with functions that extract the relevant information and then invoke the stateful reference monitor 104. The stateful reference monitor 104 response determines whether the request is passed to the original system call function, or whether an error code is returned to the user application.

Network requests are intercepted in two places. One is between the application and the Transport Data Interface—this uses a Microsoft provided API. The other intercept is performed by replacing functions in the Network Device layer. In the latter case, if the stateful reference monitor 104 wants to deny the action, then the packet is discarded as there is no application to notify.

General system calls are intercepted by replacing functions at the entry point to the operating system kernel. The arguments are checked, and then the stateful reference monitor 104 is invoked. The stateful reference monitor 104 response determines whether the request is allowed to proceed to the original function, or whether an error code is returned to the application. Examples of system calls that are intercepted include keyboard hooking and modification of memory in other processes.

COM Object invocation is intercepted by replacing functions in the standard DLL used in user applications. When a request is received, the stateful reference monitor 104 is invoked. The stateful reference monitor 104 response determines if the request is passed to the original function, or whether an error code is returned.

On other operating systems, there may be other resources that need protecting, and some of the examples above may not be applicable. However, the general approaches of either using an operating system provided interception API, or replacing function pointers with alternative interception code, may be used. Other approaches can be used, for example that involve patching the actual function code to make callouts.

The stateful reference monitor 104 acts as an additional processing step over and above any existing stateless reference monitor in the operating system. Thus, it cannot grant access when the standard stateless reference monitor would have denied access.

The rules which control the actions of the stateful reference monitor 104 can be modified and take instant effect. The contents of the storage area can be modified as part of this process.

The stateful reference monitor 104 can prompt the user when marginal situations occur. This provides valuable additional information to make correct decisions.

Other events can be received from local and remote sources, including: control servers, local operating system logs, application logs, application monitors, and other system monitors. These events can then modify the contents of the state database 107, which has the effect of potentially changing future access control decisions.

The state database 107 can be used to hold information about such items as:

Application behavior: for example, if an application accesses a resource, then this fact is remembered and can be used to modify future access decisions;

User Input: for example, a user may be prompted to provide specific information, and this information can be used to modify future access decisions;

External: for example, other systems may generate messages that can be sent to the stateful reference monitor 104, and this message information can be saved and used to modify future access decisions on this or other systems;

Time: each item of saved information can be set to be erased after an individually specified time interval;

Application inheritance: when one application starts another application, attributes associated with the parent can be transferred to the child.

The locations within the storage area can hold various different types of object, including:

Integers—often used as indicators to show if an event has occurred;

Strings—used to hold application names, file names, etc.

Arrays of Integers or Strings, can be indexed by Integers or Strings—these are useful for storing flags about resources when the resource name is used as the index.

Range trees—these are useful data structures when dealing with problems involving 'is a data item in a list of ranges?' For example, is an IP address in the range '10.0.0.0-10.255.255.255 or 192.168.0.0-192.168.255.255'.

The stateful reference monitor of the security embodiment now described operates as described below.

The stateful reference monitor 104 receives a request, for example from one of the following sources: an interceptor, a user prompt response, a regular timer, a user-space daemon, or the central server.

This request is broken down into fields, and each field is copied into a separate location in the state database 107. Additionally, the type of request is noted.

The stateful reference monitor then starts to execute the security policy. One embodiment uses a byte-code interpreter to step through the security policy implementation. The byte-code can perform simple actions such as examining a location in the storage area, and then performing arithmetic computations, or complex actions such as formatting and sending an event to another component. Other languages and methods of expressing security policy are possible.

An optimization is to split the byte-code program into a number of smaller, and simpler, byte-code programs, where each one handles a particular subset of requests. For example, each program might handle requests for a specific resource type. This reduces the number of byte-code instructions that need to be inspected for each request.

Alternative embodiments include directly executing machine level instructions, but while the performance of such an approach would be better than using byte-code, the disadvantage of complexity and the difficulty of adequately securing the machine code from attack make direct comparison difficult.

The byte-code can modify locations in the storage area to record results either temporarily or permanently for use by subsequent requests. Results may be recorded for a period of time, after which the result will be erased. This is useful when trying to detect when a sequence of actions takes place within a specific period of time.

The byte-code can indicate whether the request is to be allowed, denied or queued.

Once the byte-code is complete, and the request is to either allowed or denied, the stateful reference monitor responds to the interceptor and passes back the access determination.

If the request is to be queued, then it is placed in a queue for subsequent analysis. This can happen when the user needs to be prompted for some information, or when an operation needs to be performed by a user daemon before the final result of the request can be determined. In these cases, the stateful reference monitor will be triggered again by the user response, or by a user daemon with additional information. The byte-code will be invoked, and it will detect that this request is associated with a previously queued request. The information received as part of the request is saved in the storage area.

The previously queued request is then woken up, and is resubmitted to the byte-code portion of the stateful reference monitor. The byte-code processes the original request, but it now has the saved information in the storage area from the user response. This allows it to complete the processing of the request and return an allow or deny response.

The stateful reference monitor ensures that requests are ordered, i.e. a request either happens before or after another request. Further, a request is run through the byte-code completely, i.e. until the allow/deny/queue response is found, before the next request can start. This simplifies the implementation of both the stateful reference monitor and of the security policies.

The security policy may be written in a C-like language that is compiled into byte-code and loaded into the stateful reference monitor. Other embodiments could use a different source language, or could compile into different code formats, including machine code.

The security policy contains data about resource names, e.g. file names, network ports, object names, etc., that need to be protected. An alternative would be to split the 'data' from the 'program' and load them independently. The single program with embedded data approach is simpler.

The security policy program contains handlers for all the possible events that it can receive. Some of these handlers just return an allow or deny response, while others just cause the storage area to be updated, and some are a mixture.

The security policy program can be reloaded while the system is operational. This does not cause the storage area to be modified, and so information that was saved before the policy program was reloaded continues to be available. A special request is triggered as the first request after a reload, and this request can perform any storage area cleanup or modification that is required.

The security policy program contains three major sections:

Standard environmental instructions. These instructions perform actions such as determining the current application name, maintaining caches of information, and determining which file groups a file belongs to. These do not determine the allow/deny status, but may cause the request to be queued if required information is not available. For example, under Windows NT, a filename can be presented in 8.3 notation, a holdover from MS/DOS, or as the full filename. For access control purposes, a single form is desirable and so the 8.3 form must be converted into the full form. An 8.3 filename might be 'state~1.doc', where the full name might be 'stateful reference monitor.doc'.

Single request access control checks. These instructions perform access control checks for a single request. The information used for the check is the data from the request, e.g. for a file, this is the filename, the file extension, the type of disk (floppy, hard disk, network drive), the directory, the operation (read/write/create/delete), etc., and data configured by the system administrator. Extra constraints may arise from information in the storage area that was set as a result of an earlier received message, possibly from the central server.

Multiple request heuristics. These instructions track a sequence of actions, possibly over a limited time interval, and can allow or deny subsequent requests. Alternatively, once the sequence is recognized, a message can be sent to the central server for further processing. Typically, these sequences are used for detecting malicious behavior, and then using the detection to limit the actions that the application can perform. In some cases, the detection may not be of malicious behavior but of specific normal behavior. For example, an application that makes a network connection to TCP port 110 or TCP port 25 might be classified as an email application. This fact can then be used in subsequent access control checks, or multiple request heuristics.

The stateful reference monitor of the illustrative embodiment calls on a user daemon to perform various services that are either time consuming or difficult to perform in kernel space. These services are invoked by the stateful reference monitor sending a message to the user daemon, and queuing the request. The user daemon processes the message, performs the requested service and sends a message back to the stateful reference monitor, which then saves the result and wakes up the original request.

The services include:
Determining the application name that is running in a particular process;
Posting a dialog box and requesting user input;
Writing diagnostic data to a file;
Determining the version number of an executable;
Converting an 8.3 format filename into a full filename.

An example of the operation of the illustrative stateful reference monitor is now given.

The stateful reference monitor can be loaded with a set of rules that prevent incoming email messages from automatically sending out copies of them. This can be achieved by noting when an email client, detected by monitoring network accesses, writes out a file, detected by monitoring file accesses, while file is then read in by a scripting program, detected by monitoring file accesses, which then invokes an email sender, detected by object invocation or other means, which then reads in the original file, detected by file access. At this point the user can be queried, and the action allowed or denied. In order to detect this chain of events requires the maintenance of significant amounts of state.

However, this example does not prevent the script embedded within the email from causing damage to the host computer. In order to prevent damage, an additional step is performed. At the final stage above, a message is sent to a management server, which may then notify other stateful reference monitors that this script is to be blocked from access. The security policy program that is in effect at each stateful reference monitor decides how to handle the notification message. It may, for example, block all further writes to files once a process tries to write to a restricted file.

In addition to the variations and aspects described above, embodiments of aspects of the invention can also include the following.

Multiple stateful reference monitors may be instantiated on a single system, each with a Storage Area and a communications mechanism that permits the exchange of information, either directly or via another component. The stateful reference monitors might be partitioned based on resource type, or based on kernel-space versus user-space.

A stateful reference monitor can send configuration information to an interceptor to increase or decrease the number and types of requests sent. For example, the stateful reference monitor be able to change dynamically whether the 'CreateProcess' system call under Windows NT is to be intercepted and whether requests to this system service are sent to the stateful reference monitor.

A stateful reference monitor may have its security policy program updated frequently to incorporate new dynamic rules, rather than having a relatively static policy program and frequently updated state database.

A stateful reference monitor may either replace or wrap the existing stateless reference monitors provided by the operating system.

A stateful reference monitor may be an integral part of the operating system.

Figure 3:
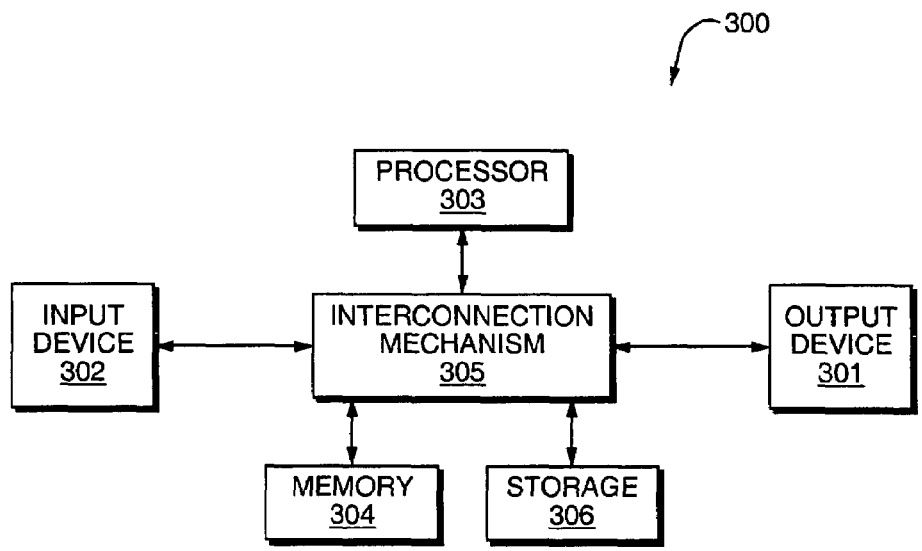
FIG. 3 is a functional block diagram of a hardware system on which the software system of FIGS. 1 and 2 can execute.

A computer system 300, shown in FIG. 3, with which the various elements of the embodiments described above, either individually or in combination, may be implemented typically includes at least one main unit connected to both one or more output devices 301 which store information, transmit information or display information to one or more users or machines and one or more input devices 302 which receives input from one or more users or machines. The main unit may include one or more processors 303 connected to a memory system 304 via one or more interconnection mechanisms 305, such as a bus or switch. Any input device 302 and output device 301 also are connected to the processor 303 and memory system 304 via the interconnection mechanism 305. The computer system 300 may further include a storage system 306 in which information is held on or in a non-volatile medium. The medium may be fixed in the system or may be removable.

The computer system 300 may be a general purpose computer system which is programmable using a computer programming language. Computer programming languages suitable for implementing such a system include procedural programming languages, object-oriented programming languages, combinations of the two, or other languages. The computer system may also be specially programmed, special purpose hardware, or an application specific integrated circuit (ASIC).

In a general purpose computer system, the processor is typically a commercially available processor which executes a program called an operating system which controls the execution of other computer programs and provides scheduling, debugging, input/output control, accounting, compilation, storage assignment, data management and memory management, and communication control and related services. The processor and operating system defines computer platform for which application programs in other computer programming languages are written. The invention is not limited to any particular processor, operating system or programming language.

Figure 4:
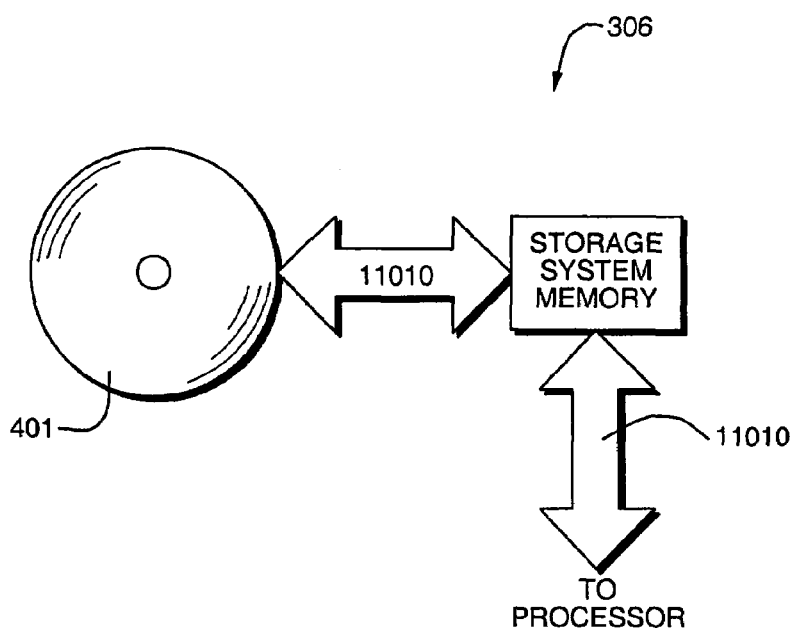
FIG. 4 is a functional block diagram of the storage system component of the system of FIG. 3.

The storage system 306, shown in greater detail in FIG. 4, typically includes a computer readable and writeable non-volatile recording medium 401 in which signals are stored that define a program to be executed by the processor or information stored on or in the medium 401 to be processed by the program. The medium may, for example, be a disk or flash memory. Typically, in operation, the processor causes data to be read from the nonvolatile recording medium 401 into another memory 402 that allows for faster access to the information by the processor than does the medium 401.

This memory 402 is typically a volatile, random access memory such as a dynamic random access memory (DRAM) or static memory (SRAM). It may be located in storage system 306, as shown, or in memory system 304, not shown. The processor 303 generally manipulates the data within the integrated circuit memory 304, 402 and then copies the data to the medium 401 after processing is completed. A variety of mechanisms are known for managing data movement between the medium 401 and the integrated circuit memory element 304, 402, and the invention is not limited thereto. The invention is not limited to a particular memory system 304 or storage system 306.

Aspects of embodiments of the invention may be implemented in software or hardware or firmware, or any combination thereof. The various elements of an embodiment, either individually or in combination, may be implemented as a computer program product including a computer-readable medium on which instructions are stored for access and execution by a processor. When executed by the computer, the instructions instruct the computer to perform the various steps of the process.

The present invention has now been described in connection with a number of specific embodiments thereof. However, numerous modifications, which are contemplated as falling within the scope of the present invention, should now be apparent to those skilled in the art. Therefore, it is intended that the scope of the present invention be limited only by the scope of the claims appended hereto.

What is claimed is:

1. A computer-implemented reference monitor, comprising:
    a monitoring process, executing on a computer, which detects plural defined events and generates event messages;
    a storage device, on the computer, in which is stored real-time state information related to the event messages generated by the monitoring process; and
    a rule interpreting process, executing on the computer, which responds to characteristics of an event message of the information stored in the storage device and a set of rules by modifying operation of the computer by selectively computing a decision to allow or block activity according to the set of rules, the rule interpreting process further comprising:
    plural interceptors for identifying the activity;
        at least one rule which defines permissible resource references in view of an activity identified by the interceptors and the real-time state information, the interceptors operable to receive a sequence of events indicative of requests for operating system resources, the set of rules collectively defining a processing policy; and
        a rule interpreter which applies the rule to the identified activity and the real-time state information,
    the monitoring process operable to:
        operate in a state collection mode, the state collection mode operable for gathering normal patterns of activity;
        subsequently operate in a lockdown mode, the lockdown mode operable to detect and distinguish predetermined patterns of events and the gathered normal patterns of activity;
        identify detected patterns as unsafe based on user selection; and
        implement the decision to block or allow the identified activity.

2. The computer-implemented reference monitor of claim 1, wherein the set of rules is modified in response to the information stored in the storage device.

3. The computer-implemented reference monitor of claim 2, wherein the set of rules is modified and wherein the information stored in the storage device is preserved when the set of rules is modified.

4. The computer-implemented reference monitor of claim 1, further comprising an external event message generating process executing on another computer, wherein the external event message generating process communicates event messages to the rule interpreting process.

5. The computer-implemented reference monitor of claim 1 further computing a decision based on the processing policy defined by the rules to block or allow the event to be transmitted.

6. The computing-implemented reference monitor of claim 5 wherein the rules further comprise compiled rule byte code operable to perform selection of an active rule set and an inactive rule set such that only a particular rule set is in effect at a particular time.

7. The computer-implemented reference monitor of claim 6 further operable to overwrite the rule byte code in a predetermined memory area and overwriting revised result byte code to effect a revised active rule set; the rule set operable for dynamic modification during persistent system operation.

8. The computer-implemented reference monitor of claim 7 wherein the rules defining allowable and disallowable activity further comprise a predetermined pattern of events and an identified prohibited pattern.

9. An encoded set of processor based instructions on a machine-readable medium for performing a method of event processing employing a real-time stateful reference monitor including:
    a set of instructions defining a storage area where real-time state information is stored and from which the state information is restored;
    a set of instructions including a plurality of rules defining allowable activity based on a pattern of activity; and plural interceptors identifying and governing the activity by selectively computing a decision to allow or block activity based on an application of the rules to the activity;
    a set of instructions for correlating the state information across different ones of the plural interceptors, the process including the set of instructions which correlates the state information further comprising:
        a rule which defines permissible resource references in view of an activity identified by the plural interceptors and the real-time state information, the interceptors operable to receive a sequence of events indicative of requests for operating system resources; and
        a rule interpreter which applies the rule to the identified activity and the real-time state information; p1 a set of instructions for computing a decision based on the processing policy defined by the rules to block or allow the event to be transmitted, the rules further comprising compiled rule byte code operable to perform selection of an active rule set and an inactive rule set such that only a particular rule set is in effect at a particular time, the rules defining allowable and disallowable activity further comprising a predetermined pattern of events and an identified prohibited pattern;
    the set of instructions defining the identified prohibited pattern further comprising:

a set of instructions for operating in a state collection mode, the state collection mode operable for gathering normal patterns of activity;

a set of instructions for subsequently operating in a lockdown mode, the lockdown mode operable to detect and distinguish predetermined patterns of events and the gathered normal patterns of activity; and a set of instructions for identifying detected patterns as unsafe based on user selection, the set of instructions operable to direct the process to implement the decision to block or allow the identified activity.

10. A computer-implemented reference monitor, comprising:

a monitoring process, executing on a computer, which detects plural defined events and generates event messages;

a storage device, on the computer, in which is stored real-time state information related to the event messages generated by the monitoring process;

a plurality of rules defining allowable activity based on a pattern of activity;

plural interceptors identifying and governing the activity; and a rule interpreting process that correlates the real-time state information across different ones of the plural interceptors, executing on the computer, which responds to characteristics of an event message of the information stored in the storage device and the plurality of rules by modifying operation of the computer by selectively computing a decision to allow or block activity according to the plurality of rules, the rule interpreting process further comprising:

at least one rule which defines permissible resource references in view of an activity identified by the interceptors and the real-time state information, the interceptors operable to receive a sequence of events indicative of requests for operating system resources, the plurality of rules collectively defining a processing policy; and a rule interpreter which applies the rule to the identified activity and the real-time state information, the monitoring process operable to implement the decision to block or allow the identified activity operate in a state collection mode, the state collection mode operable for gathering normal patterns of activity;

subsequently operate in a lockdown mode, the lockdown mode operable to detect and distinguish predetermined patterns of events and the gathered normal patterns of activity;

identify detected patterns as unsafe based on user selection; and implement the decision to block or allow the identified activity.

11. The computer-implemented reference monitor of claim 10, wherein at least one of the plural interceptors is a pre-existing element of a conventional computer operating system.

12. The computer-implemented reference monitor of claim 10, wherein the rule interpreting process that correlates the state information further comprises:

a rule which defines permissible resource references in view of activity identified by the interceptors and the state information, the rules defining a processing policy;

a rule interpreter which applies the rule to the activity identified and the state information; and a stateful reference monitor operable to compute a decision based on the processing policy to block or allow the event to be transmitted.

13. The computer-implemented reference monitor of claim 12, wherein the rule can be modified without restarting the real-time reference monitor.

14. The computer-implemented reference monitor of claim 12, wherein the storage area has contents which are preserved when the rule is modified.

15. The computer-implemented reference monitor of claim 10, wherein the plural interceptors correspond to more than one resource type and wherein the storage area is a single storage area.

16. The computer-implemented reference monitor of claim 10, further comprising:

an application program interface that can send messages to application programs on the same system.

17. The computer-implemented reference monitor of claim 16, further comprising:

an application program interface that can send messages to application programs on other systems.

18. The computer-implemented reference monitor of claim 10, wherein the plural interceptors monitor two or more of file access, registry access, network access, object access, system call access, keyboard access, external inputs and user input.

* * * * *

UNITED STATES PATENT AND TRADEMARK OFFICE
CERTIFICATE OF CORRECTION

| | |
|---|---|
| PATENT NO. | : 7,290,266 B2 |
| APPLICATION NO. | : 10/071328 |
| DATED | : October 30, 2007 |
| INVENTOR(S) | : Philip J. S. Gladstone and Jeffrey A. Kraemer |

It is certified that error appears in the above-identified patent and that said Letters Patent is hereby corrected as shown below:

Claim 10, Column 17, Lines 43 through 51, should read:
--the monitoring process operable to: operate in a state collection mode, the state collection mode operable for gathering normal patterns of activity; subsequently operate in a lockdown mode, the lockdown mode operable to detect and distinguish predetermined patterns of events and the gathered normal patterns of activity; identify detected patterns as unsafe based on user selection; and implement the decision to block or allow the identified activity--.

Claim 9, Column 16, Line 55, "p1 a set..." should read --a set...--.

Signed and Sealed this

First Day of July, 2008

JON W. DUDAS
*Director of the United States Patent and Trademark Office*